United States Patent Office 3,337,734
Patented Aug. 22, 1967

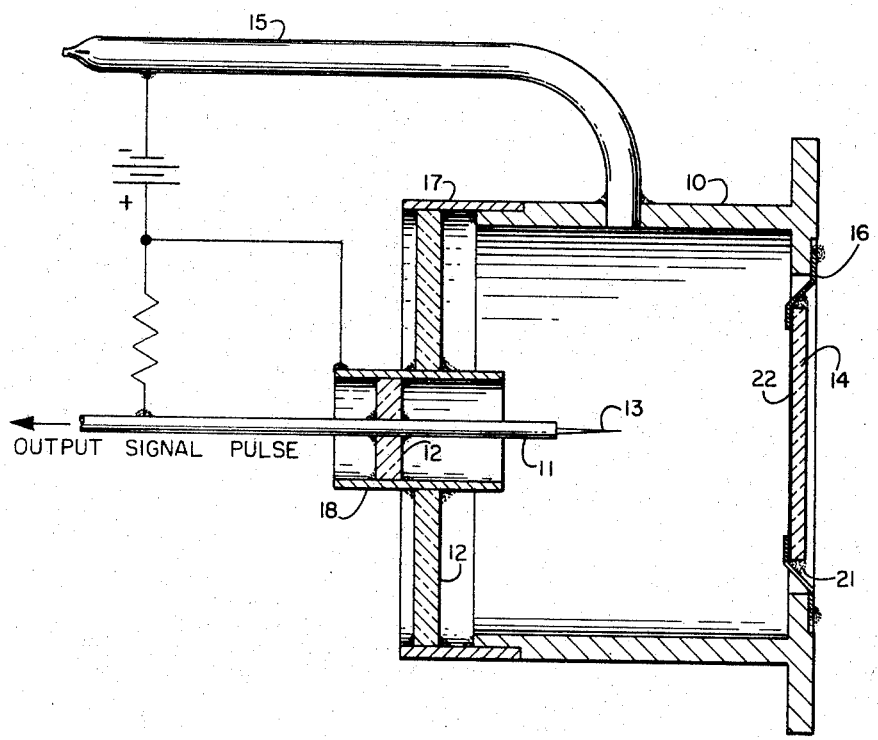
INVENTOR
TALBOT A. CHUBB

3,337,734
SPACE CHARGE LIMITED AVALANCHE
COUNTER FOR ULTRA-VIOLET RADIA-
TION DETECTION
Talbot A. Chubb, Arlington, Va., assignor to the United
States of America as represented by the Secretary of
the Navy
Filed Jan. 29, 1965, Ser. No. 429,182
8 Claims. (Cl. 250—83.6)

ABSTRACT OF THE DISCLOSURE

This invention is directed to a space charge limited avalanche photon counter in which the operation is between that of a proportional counter and a Geiger counter. The tube includes an anode structure which is critical in the operation of the tube. The relationship of the anode with the window, the gaseous filling and the applied voltage produces signal pulses that do not grow proportionally as the number of primary ionizing particles that enter the tube increases. Thus, the output pulse is only slightly larger for a larger increase in the ionizing energy released by a radioactive event in the tube. This tube is particularly useful for detecting avalanches produced by a single electron such as occur in ultraviolet photon counters.

---

The invention described herein may be manufactured and used by or for the Government of the United States of America for governmental purposes without the payment of any royalties thereon or therefor.

The present invention relates to photon counter type tubes and more particularly to a space charge limited avalanche counter tube which is selectively sensitive to ultraviolet radiation within the wavelengths from about 1050 Angstrom units to about 1300 Angstrom units which is adapted for use in counting ultraviolet photons.

The present invention is related to the Geiger-Müller tube. The Geiger-Müller tube is a well known device for measuring electromagnetic radiation. Basically the tube comprises a central anode wire surrounded by a cylindrical cathode, with the cathode either forming the outer enclosing wall of the counter tube or with both elements enclosed in a radiation permeable envelope, and a suitable ionizable gas or gas mixture within the counter. Radiation entering the tube causes ionization of a portion of the gas filling either directly in the gas or by causing emission of electrons from the cathode surface. When the the potential across the two elements is of the order of magnitude of about 300 to 1,000 volts, a chain of ionization occurs within the gas such that in a very short period of time the gas is discharged by corona discharge between the cathode and anode, resulting in a decreased potential between the two elements. The discharge creates an electrical pulse which is measurable on external circuitry. Suitable quenching means are provided, either by means of a quenching gas within the counter or by an external circuit, to deionize the gaseous filling and condition the counter for a new event. The initial ionizing action can depend upon the emission of photo electrons from the cathode surface or from direct photoionization of gas molecules when activated by radiation in the ultraviolet region. When such counters depend on photoelectric emission they require cathodes of suitable material which is photo sensitive to ultraviolet radiation and a window of radiation permeable material so that the ultraviolet radiation can readily enter the tube.

The present invention is also related to the proportional counter tube. The proportional counter is a counter tube similar to a Geiger-Müller counter tube which operates at a voltage raised only high enough so that electrons gain enough energy to cause additional ionization in the gas. For each free electron produced in the gas near the cathode by photoelectric effect or photoionization, N electrons will be colleced by the anode electrode. Thus each original electron produced by incident radiation and the descendent electrons produced by subsequent electron collisions in the counter gas are collected by the anode electrode. This process by which a single electron becomes N electrons is called an electron avalanche, or Townsend avalanche.

In a Geiger-Müller counter the same size electrical pulse is produced external to the device regardless of the number of initiating electrons in the primary ionizing event. In other words the pulse produced by an alpha particle traversing the counter gas, which produces multitudes of initial electrons is the same size as the count produced by a single photoelectron ejected from the cathode by an ultraviolet photon. The Geiger counter discharge is a triggered corona discharge. In contrast, in the proportional counter an ionizing event produces an output pulse which is proportional to the number of initial electrons produced by the ionizing event. Hence, in a proportional counter, the electrical pulse produced by an alpha particle passing through the counter gas is many times as large as the pulse produced by a single photoelectron.

The space charge limited avalanche counter of the present invention is a photon counter between the proportional counter and the Geiger counter. Like the proportional counter, the avalanche counter is designed to produce an electrical pulse as a result of an ionizing event within the counter tube wherein the electrical pulse is produced by an electron avalanche resulting from secondary ionization within the tube caused by free electrons approaching the geometrically small anode electrode of the counter, rather than a counter in which the output pulse is the result of a triggered electrical discharge. The tube of the present invention produces signal pulses that do not grow proportionally as the number of primary ionizing particles that enter the tube increases. Thus, the output pulse is only slightly larger for a larger increase in the ionizing energy released by a radioactive event in the tube. The tube of the present invention produces output pulses close to the same total amplitude for each event regardless of the amount of the primary ionization.

The counter tube of the present invention is especially useful in detecting avalanches produced by a single electron such as occur in ultraviolet photon counters. The reason is as follows: As compared with a proportional counter, the present invention produces larger and more uniform sized output pulses. In the proportional counter, although the average pulse resulting from a single photoelectron contains N electrons, each individual pulse shows a large statistical spread about this average value. Most photons result in pulses containing considerably less than N electrons, a few pulses contain many more electrons. In the present invention the pulses are clustered closely about the average size. The present invention also has an advantage over the Geiger counter in that it can produce many more counts per second. The maximum rate of a Geiger counter is typically 2000–5000 counts per second. The present invention can operate at 100,000 counts per second. Thus the present invention produces bigger and more consistently sized pulses for single electrons than do proportional counter tubes and in produces smaller pulses than a Geiger tube, but can count at a considerably higher rate.

It is, therefore, an object of the present invention to provide a sensitive photon counter capable of detecting ultraviolet photons.

Another object is to provide a photon counter which is of simple construction, durable and stable in use.

Still another object is to produce a photon counter tube which can count at a faster rate than can a Geiger counter and which provides output pulses larger and more uniform in size than that produced by single photons in proportional counters.

While still another object is to provide a photon counter operable in the 1050 to 1300 Angstrom unit range.

Further objects and advantages of the present invention will become apparent from a more careful study of the following detailed description and accompanying drawing, in which:

The drawing is a sectional view of the photon counter of the present invention.

The space charge limited avalanche counter of the present invention is of the type generally referred to as an end window counter. The window functions to pass radiation above a certain wavelength, while having a transmission cut off at a specific wavelength while passing all wavelengths above the wavelength of the lower limit cut off. A gas mixture is disposed within the tube, wherein the gas mixture functions to limit operation of the tube to a desired upper wavelength being ionized by radiation below the ionization threshold of the gas. The gas mixture and window thereby provide the operational range for the tube between the lower wavelength cutoff of the window and the upper wavelength cutoff of the gas mixture. The counter is provided with a small sharp pointed anode such that with operation at a sufficiently high voltage, the space charge produced within the avalanche limits the growth of the avalanche. Thus the output pulse of the tube remains approximately the same for different amounts of early avalanche growth resulting from the initial election.

Now referring to the drawing, there is shown in cross section a space charge limited avalanche counter made in accordance with the present invention. The tube includes an electrically conductive cylindrical member 10 which serves as the cathode and is made of a material such as stainless steel or any other suitable material which does not exhibit any photoelectric effect due to photon incidence nor reacts with a gaseous filling within the tube. An anode 11 coaxial with the cathode is insulated from the cathode by suitable insulation 12 such as alumina ceramic and extends axially along the cathode such that the inner end terminates at the center of the tube. The anode is of specific configuration having a diameter of about 0.040 inch with a sharp pointed end portion 13 extending therefrom. The sharp pointed end portion is of about 0.375 inch in length and of about 0.001 inch in diameter near the inner end of the anode portion 11 graduated down to a sharp point at the outer end. The opposite end of the tube is provided with a lithium fluoride window 14 through which ionizing radiation enters. A space between the anode termination point and the inner surface of the window is made roughly equal to the cathode radius, or larger. The lithium fluoride window has a short wavelength cut off of about 1050 Angstroms so that shorter wavelengths do not enter the tube while longer wavelengths are permitted to enter. A suitable gas such as ammonia, methane, carbon dioxide or methylamine is disposed within the tube which functions to provide a high limit cutoff for the radiation entering through the lithium fluoride window. Thus, the wavelength lower limit cutoff is determined by the window through which the radiation enters and the upper wavelength cut off is determined by the gas mixture within the cathode envelope. A copper tube 15 or any other suitable material is secured to the cylindrical cathode to provide means through which the counter tube may be evacuated and through which a gaseous filling may be added to the tube. The evacuation-gas filler tube also provides a suitable conductor to which a high voltage may be connected.

The counter tube may be operated with different gas filling at different pressures and each operable over a different high voltage such as the following:

| Gas | Pressure (mm.) | Neg. voltage |
| --- | --- | --- |
| Ammonia | 100 | 1,105 |
| Carbon dioxide | 100 | 1,370 |
| Methane | 50 | 1,240 |
| Methylamine | 30 | 970 |

In operation, the lithium fluoride window permits ionizing radiation having wavelengths above 1050 Angstrom units to enter the tube. This ionizing radiation such as ultraviolet results in an ionizing event within the tube which produces ions and releases free electrons resulting in a Townsend avalanche due to secondary ionization within the tube caused by free electrons approaching the geometrically small anode electrode of the tube. A signal output is produced due to the Townsend avalanche wherein the amplitude of the output pulse is approximately the same regardless of the ionizing statistical variation in the early growth of the avalanche. The tube is operated at a sufficiently high voltage that the space charge produced within the avalanche limits the growth of the avalanche so that the avalanche resulting from a fast early growth is only slightly larger than the avalanche produced by an avalanche which had slow early growth. This tube also produces larger output pulses due to single electrons than is possible by proportional counters. The gas in the tube limits the upper wavelength and the small sharp pointed electrode enables the tube to operate as desired in detecting single electrons. The avalanche detector can produce more pulses per second than is possible in the Geiger counter or other triggered discharge tubes.

The counter tube may be constructed simply and operate satisfactorily; however, for better and more efficient operation the tube must be carefully constructed. An example of careful construction is as follows: The cylindrical cathode 10 is made of stainless steel, copper or any other suitable material. The window end of the tube is closed by a silver flange 16 that is soldered to the cathode, and the lithium fluoride window 14 is secured to the flange by a silver chloride solder 21. The lithium fluoride window has a nickel coating 22 on the inside which has a resistance of about 25,000 ohms and which transmits at least 90% of the incident radiation. The nickel coating insures a conductive surface over the window to prevent electron build up in the area of the window.

The opposite end of the cathode has welded thereto a cylindrical element 17 of Kovar (an alloy of iron, nickel and cobalt which provides a coefficient of expansion approximately that of ceramic or glass), the Kovar provides a good surface which can be welded to the cathode and soldered to a metallized portion of ceramic insulation material such as alumina ceramic which closes the end of tube opposite from the window. The anode 11 is inserted through the insulation 12 and a metal shield 18 of Kovar is inserted through the insulation and spaced from the anode by insulation. The shield prevents any noise leakage current from passing through the insulation to the anode. The shield 18 also provides an element to which the outer conductor of a coaxial cable may be connected. The inner conductor of the coaxial cable is connected to the anode and conducts the output signal pulse to a sensitive pulse amplifier for further processing. The outer conductor of the coaxial cable protects the inner conductor and therefore the output signal pulse.

A simple electrical circuit is shown connected to the tube for operation of the tube. A high voltage negative power source is connected with the negative side connected to the cathode through use of the copper tube 15. The positive side is connected with the anode shield 18. A one meg. ohm resistor is connected between the positive side of the voltage source and the anode to provide a return to operating potential after each pulse due to an avalanche. Thus the electrons will not collect or build up around the anode and prevent the counter tube from operating.

The tube has been described for use with a specific gas filling and applied negative voltage source. However the gas filling pressure may be changed with an appropriate change in voltage. The choice of gas affects the spectral sensitivity band. Also, the gas filling may be a mixture rather than a single constituent wherein the applied voltage must be changed accordingly. The gas mixture should contain polyatomic or diatomic molecules to provide good operation. The important feature is the combination of gas filling, applied voltage, and the relationship between the cathode and the anode, especially the sharp pointed end of the anode.

Obviously, many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A space charge limited avalanche counter tube which comprises:
   a cylindrical cathode forming the housing of said counter tube,
   a radiation transparent lithium fluoride window secured across one end of said cathode,
   an insulation secured across the opposite end of said tube,
   an anode extending through said insulation linearly along the axis of said cathode into the area bounded by said cathode,
   said anode having a diameter of about 0.04 inch over a greater portion of its length and a shorter length portion of about 0.001 inch diameter at their junction and terminating in a point,
   said pointed portion extending from the inner end of said anode and coaxial therewith,
   said anode having a spacing between the inner end thereof and said window which is at least about equal to the diameter of the greater portion thereof,
   a gaseous filling within said cylindrical housing containing polyatomic molecules selected from a group consisting of ammonia, carbon dioxide, methane, and methylamine,
   said gas filling having a filling pressure range of from about 30 mm. to about 100 mm.,
   said tube providing sensitivity to ultraviolet light over a wavelength range of from 1050 Angstrom units to about 1300 Angstrom units.

2. A space charge limited avalanche counter tube which comprises:
   a cylindrical cathode forming the housing of said counter tube,
   a radiation transparent lithium fluoride window secured across one end of said cathode,
   an insulation secured across the opposite end of said tube,
   an anode extending through said insulation linearly along the axis of said cathode into the area bounded by said cathode,
   said anode having a diameter of about 0.04 inch over a greater portion of its length and a shorter length portion having a diameter of about 0.001 inch at their junction and shaped as a gently tapered cone terminating in a sharp point,
   said sharp pointed portion extending from the inner end of said anode and coaxial therewith,
   said anode having a spacing between the inner end thereof and said window which is at least equal to the diameter of the greater portion thereof,
   a gaseous filling within said cylindrical housing containing polyatomic molecules selected from a group consisting of ammonia, carbon dioxide, methane and methylamine,
   said gas filling having a filling pressure range of from about 30 mm. to about 100 mm.,
   said tube providing sensitivity to ultraviolet light over a wavelength range of from 1050 Angstrom units to about 1300 Angstrom units.

3. A space charge limited avalanche counter tube has claimed in claim 2, wherein, said counter tube operates at an applied negative voltage selected from a range from about 970 volts to about 1370 volts.

4. A space charge limited avalanche counter tube as claimed in claim 3 wherein,
   said gas filling is ammonia at a pressure of about 100 mm., and
   said applied negative voltage is at about 1105 volts.

5. A space charge limited avalanche counter tube as claimed in claim 3, wherein,
   said gas filling is carbon dioxide at a pressure of about 100 mm., and
   said applied negative voltage is at about 1370 volts.

6. A space charge limited avalanche counter tube as claimed in claim 3, wherein,
   said gas filling is methane at a pressure of about 50 mm., and
   said applied negative voltage is at about 1240 volts.

7. A space charge limited avalanche counter tube as claimed in 3, wherein,
   said gas filling is methylamine at a pressure of about 30 mm., and
   said applied negative voltage is at about 970 volts.

8. A space charge limited avalanche counter tube as claimed in claim 3, wherein,
   said anode extends into said cathode housing along the axis thereof to about the mid-point.

References Cited
UNITED STATES PATENTS

| | | | |
|---|---|---|---|
| 2,917,647 | 12/1959 | Fowler et al. | 250—83.6 X |
| 2,921,216 | 1/1960 | Chubb | 313—93 X |
| 2,978,603 | 4/1961 | Fite et al. | 313—101 X |

ARCHIE R. BORCHELT, *Primary Examiner.*